June 23, 1970 L. H. KROHN ET AL 3,516,400

METHODS AND APPARATUS FOR DETERMINING BODY COMPOSITIONS

Filed June 6, 1966 8 Sheets-Sheet 1

INVENTORS
LAWRENCE H. KROHN
CHARLES D. STOUT

BY

Leonard J. Seeger
ATTORNEY

METHODS AND APPARATUS FOR DETERMINING BODY COMPOSITIONS

Filed June 6, 1966 8 Sheets-Sheet 2

INVENTORS
LAWRENCE H. KROHN
CHARLES D. STOUT

BY Richard J. Seeger

ATTORNEY

INVENTORS
LAWRENCE H. KROHN
CHARLES D. STOUT
BY
Richard J. Seeger
ATTORNEY

INVENTORS
LAWRENCE H. KROHN
CHARLES D. STOUT
BY
Richard T. Seeger
ATTORNEY

INVENTORS
LAWRENCE H. KROHN
CHARLES D. STOUT
BY
Richard J. Seeger
ATTORNEY

June 23, 1970 L. H. KROHN ET AL 3,516,400

METHODS AND APPARATUS FOR DETERMINING BODY COMPOSITIONS

Filed June 6, 1966 8 Sheets-Sheet 6

INVENTORS
LAWRENCE H. KROHN
CHARLES D. STOUT

BY Richard T. Seeger
ATTORNEY

INVENTORS
LAWRENCE H. KROHN
CHARLES D. STOUT
BY
Richard J. Seeger
ATTORNEY

INVENTORS
LAWRENCE H. KROHN
CHARLES D. STOUT
BY
Richard T. Seeger
ATTORNEY 3,516,400

METHODS AND APPARATUS FOR DETERMINING BODY COMPOSITIONS

Lawrence H. Krohn, Detroit, and Charles D. Stout, Livonia, Mich., assignors to The Bendix Corporation, a corporation of Delaware Filed June 6, 1966, Ser. No. 562,992
(Filed under Rule 47(a) and 35 U.S.C. 116)
Int. Cl. A61b 5/04, 5/05
U.S. Cl. 128—2.06 25 Claims

ABSTRACT OF THE DISCLOSURE

A method and apparatus for measuring signals on the surface of a body and relating the measured signals to electrical activity at any point within that body. In the preferred embodiment, pulsating electrical signals emitted by an internal member of the human body are measured at a plurality of points on a surface of that body and a number of times during each pulse. These measured signals are processed to determine a solution to an equation expressing the potential distribution for the geometry of the body involved, said equation also being a solution to Laplace's equation. Then the electrical activity at various points in a selected area, such as through one particular cross section of the heart, is calculated using the solution obtained. The pattern of this activity is displayed on a screen. Since it is known that scar tissue behaves differently electrically than does healthy tissue, a pattern of the electrical activity observed at the heart, and the way in which this pattern changes during a pulse indicates the composition of that heart.

This invention pertains to methods and apparatus for determining body composition and more particularly for determining the composition of the human heart.

It is an object of this invention to determine the composition of a body organ by placing a plurality of electrical signal pickup probes, preferably eight or more, on the body and using the electrical signals received by the probes to compute the electrical activity in and on a body organ such as the heart, to determine the composition of the organ. More particularly, it is an object to determine the presence and location of scar tissue, or infarct, in and on the heart which evidences previous heart damage resulting from heart attacks.

It is an object of this invention to plot lines which are formed by connecting points of equal electrical signal amplitude occurring on a body organ inside the body to determine the composition of the organ. For example, scar tissue behaves differently electrically than normal tissue and therefore scar tissue can be detected electrically. In the heart, presence of scar tissue may be determined since such tissue never develops a positive current during the depolarization waves of the heart whereas normal tissue will develop a positive current during at least a portion of the depolarization wave.

It is an object of this invention to compute data from the electrical signal probes in such a manner that a quadripole electrical activity may be determined as well as dipole electrical activity.

These and other objects will become more apparent when a preferred embodiment of this invention is described in connection with the drawings in which.

Figure 2:
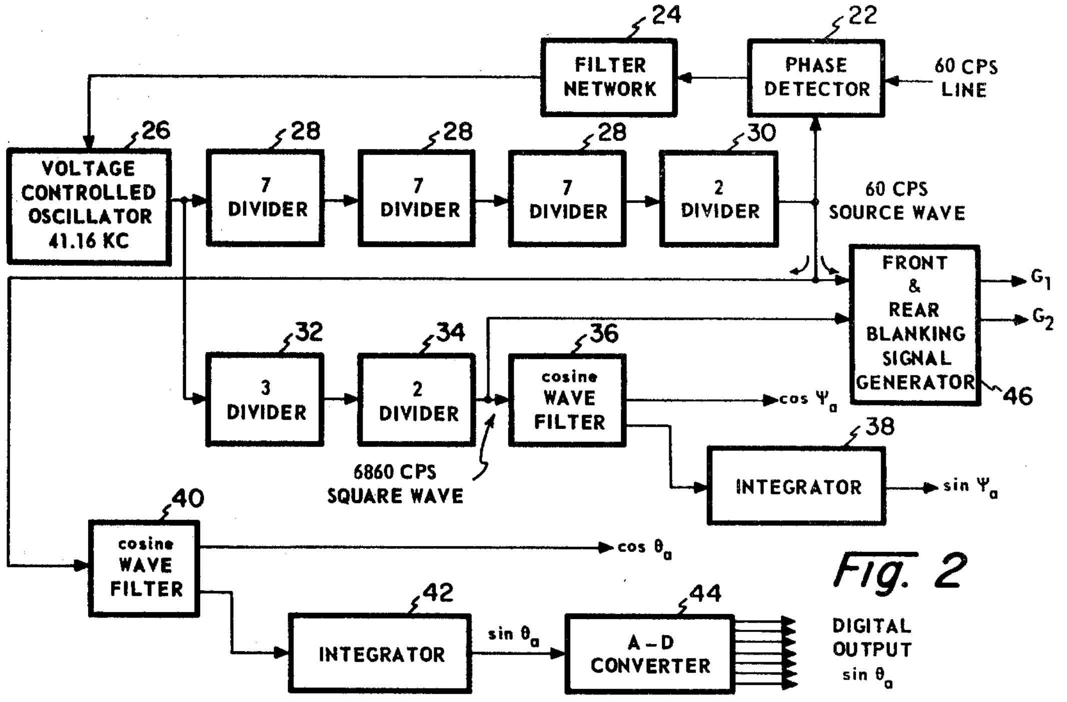
FIG. 2 is a block diagram showing the development of scanning voltages which are used in conjunction with probe voltages to outline electrical activity of an internal body organ.
Figure 2A:
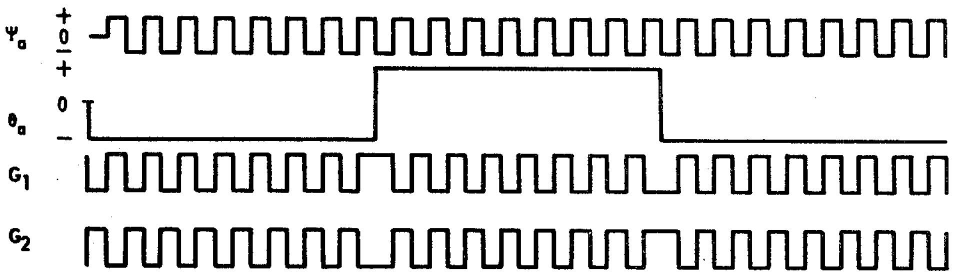
Figures 3, 3A:
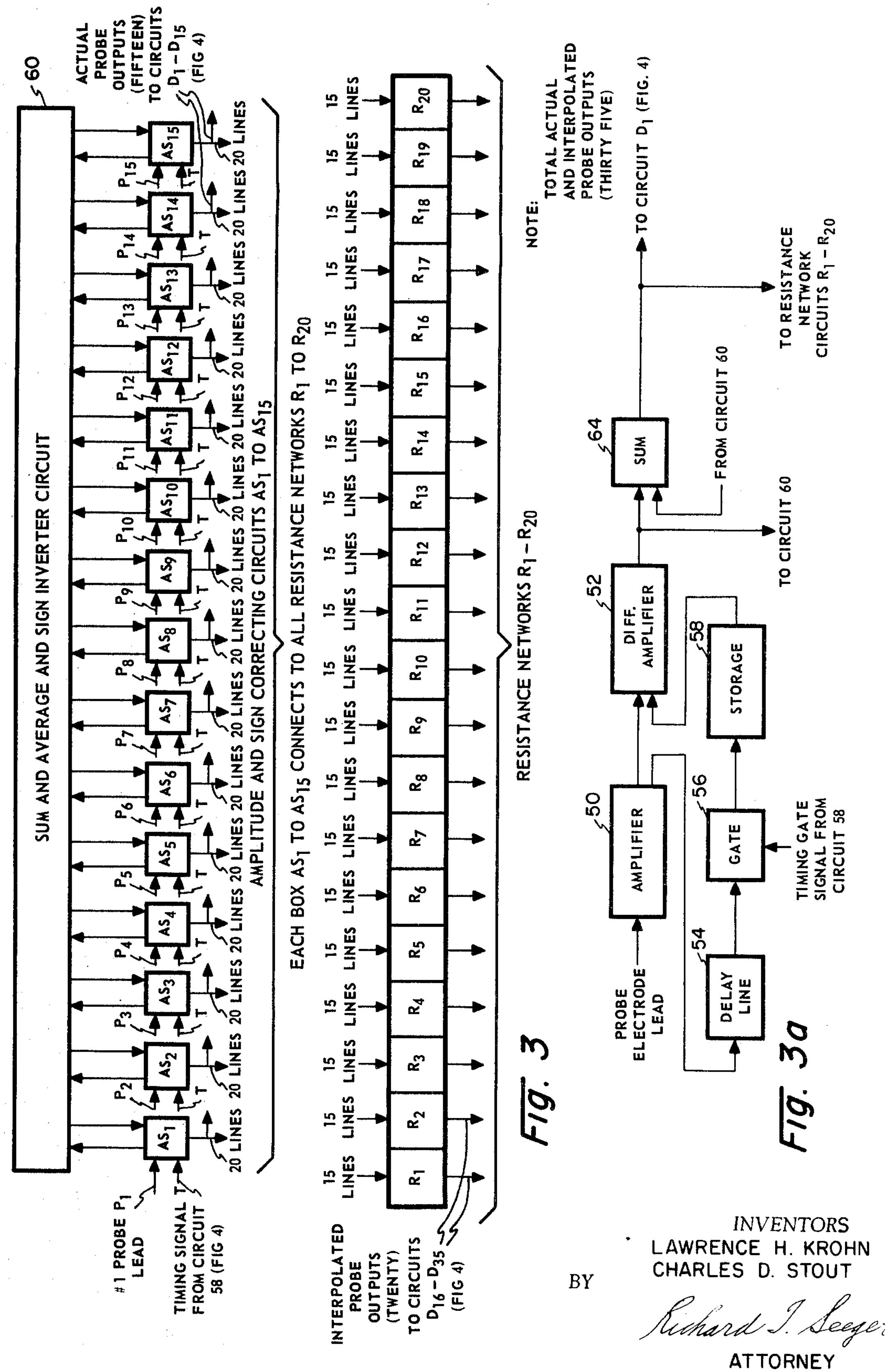
Figure 4:
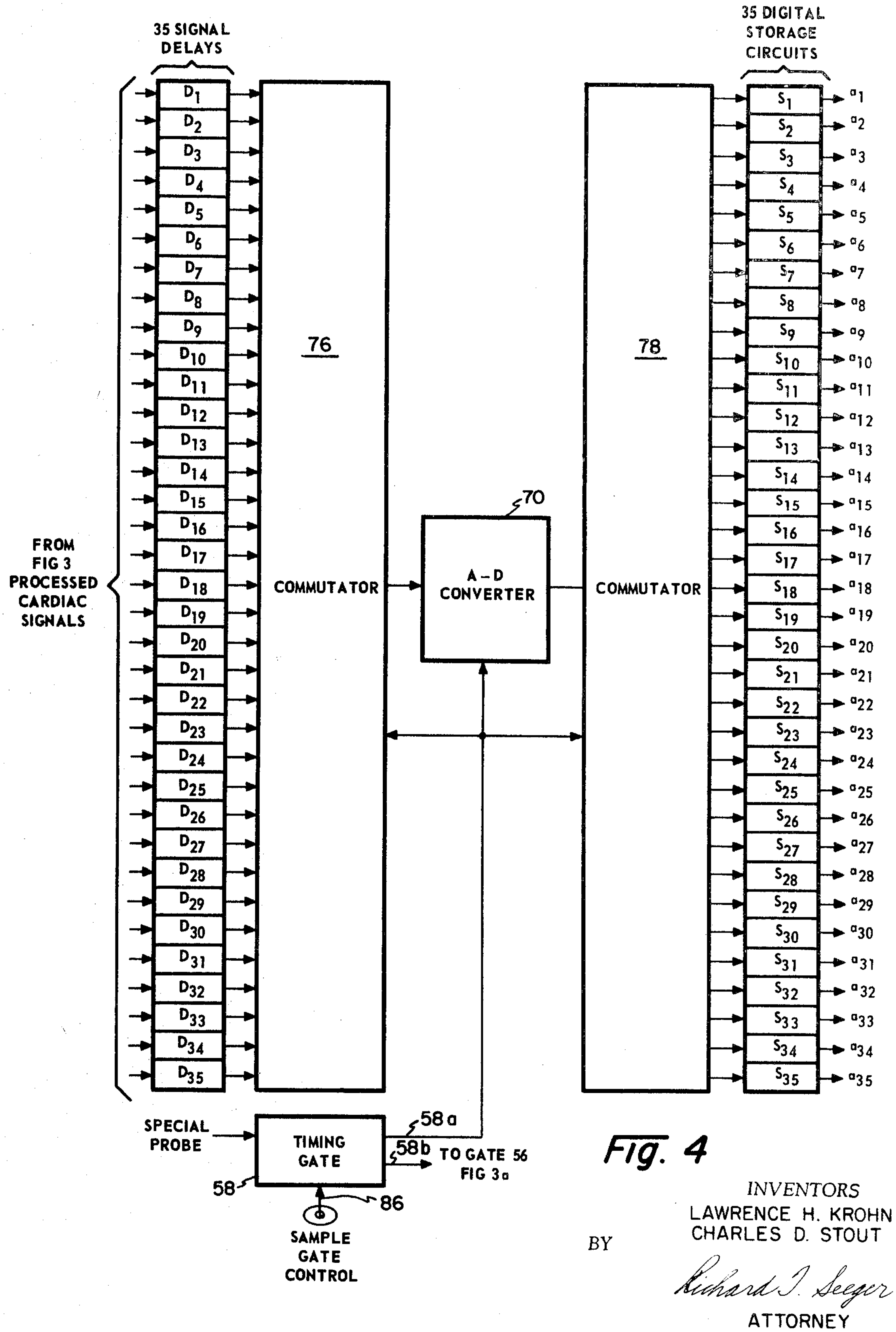
Figure 5:
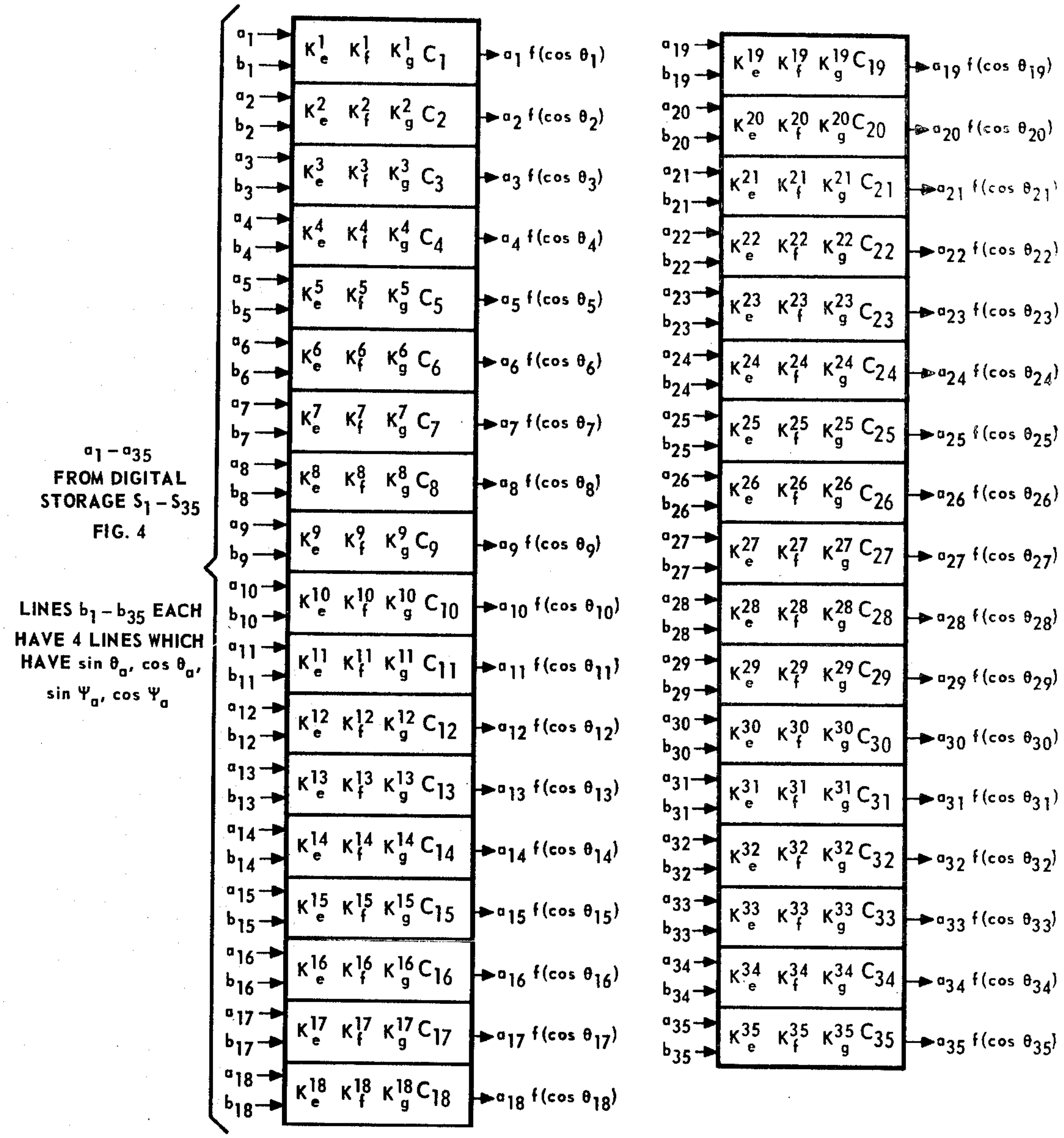
Figure 5A:
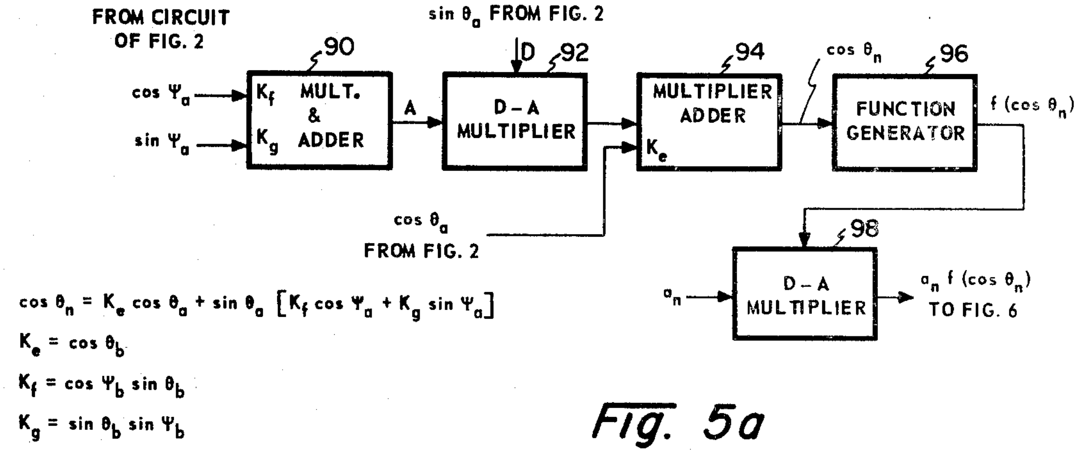
Figure 5B:
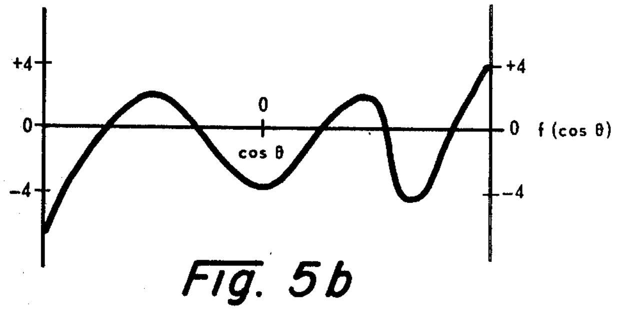
Figure 5C:
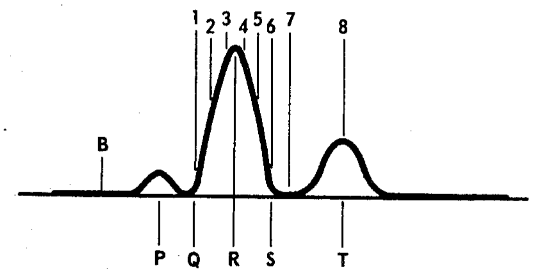
Figure 6:
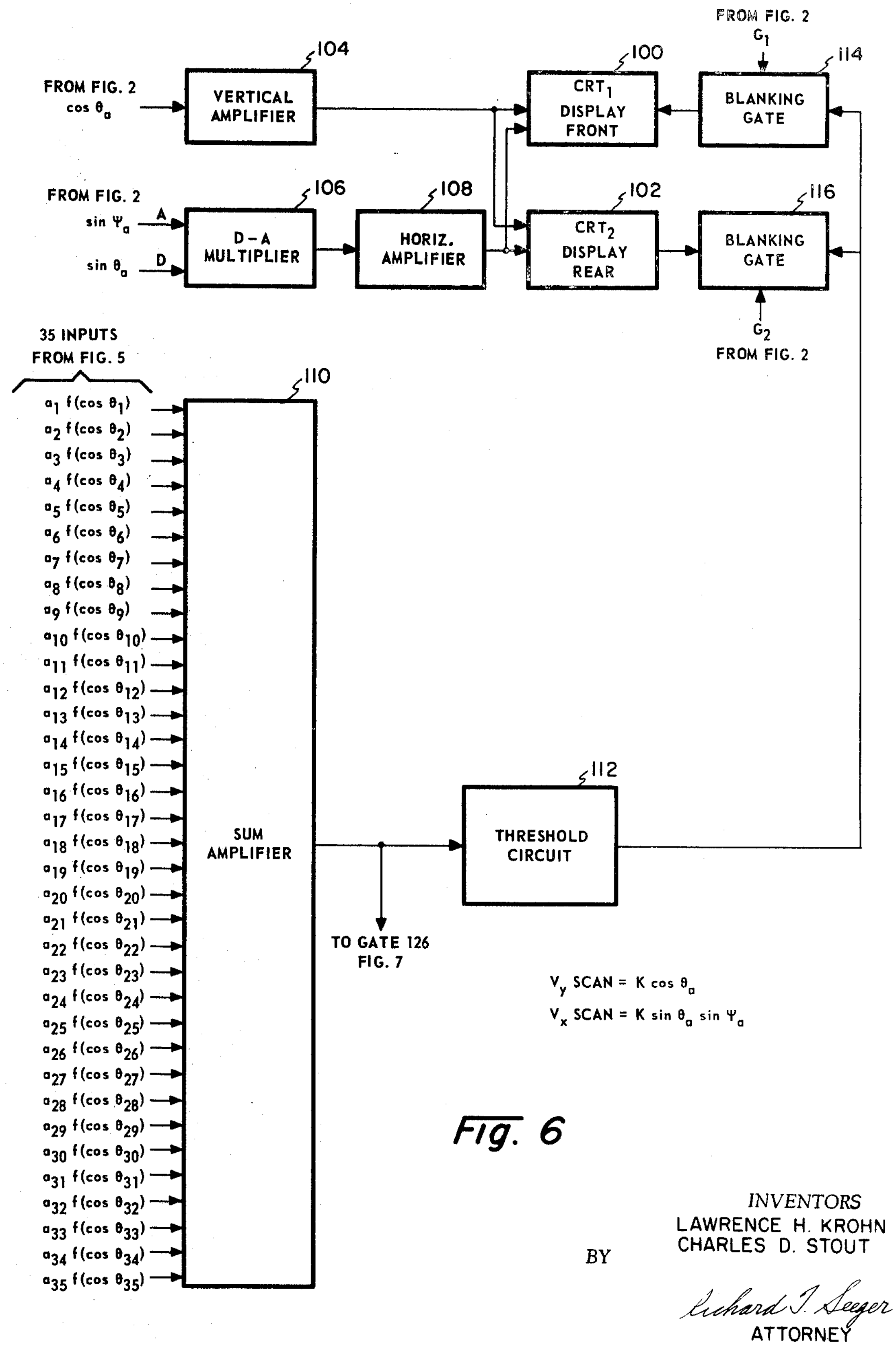
Figure 7:
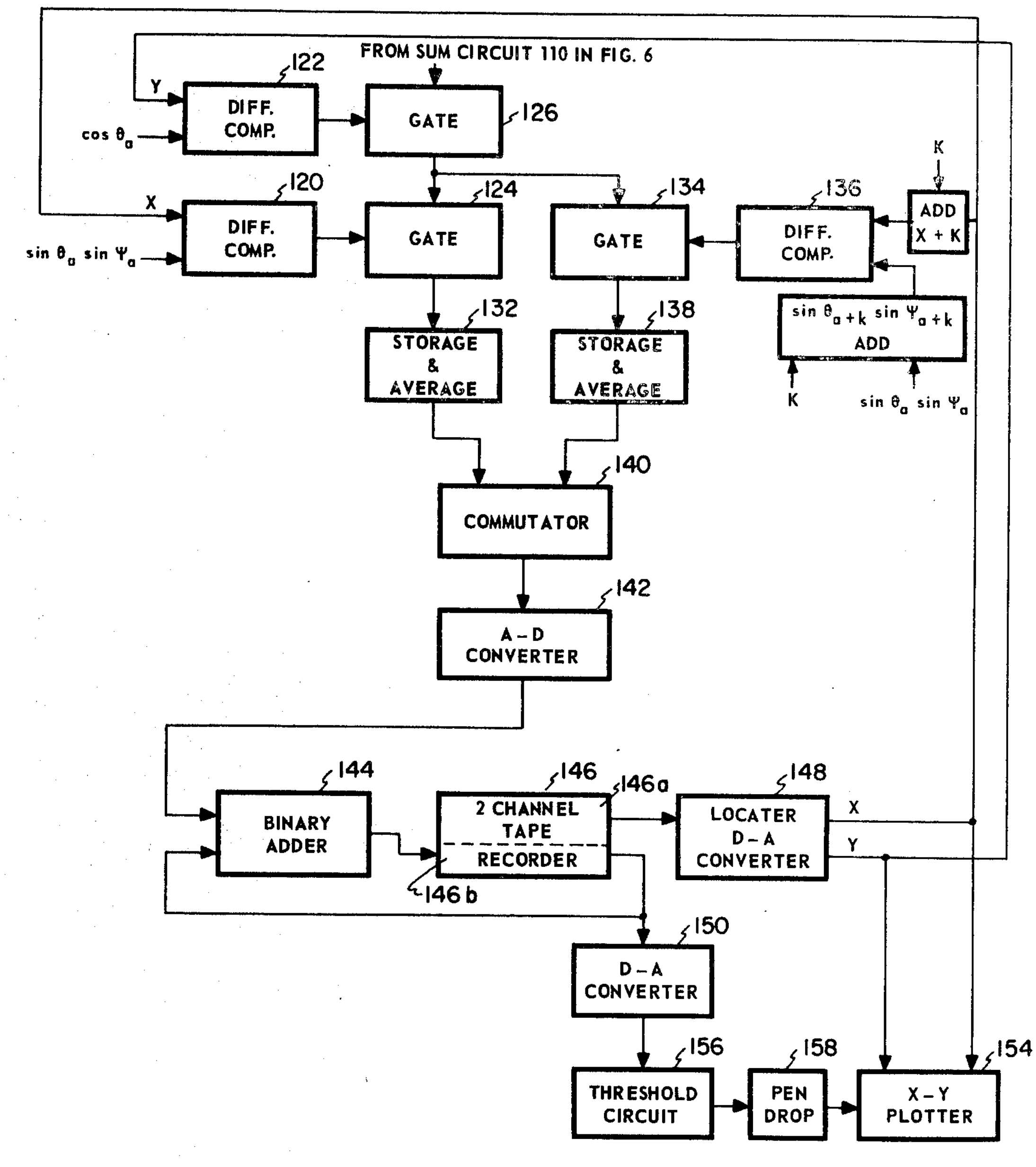
Figure 8:
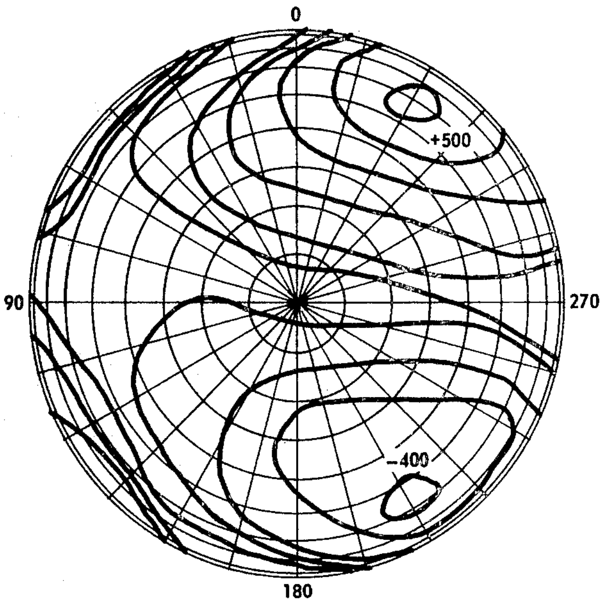
Figure 9:
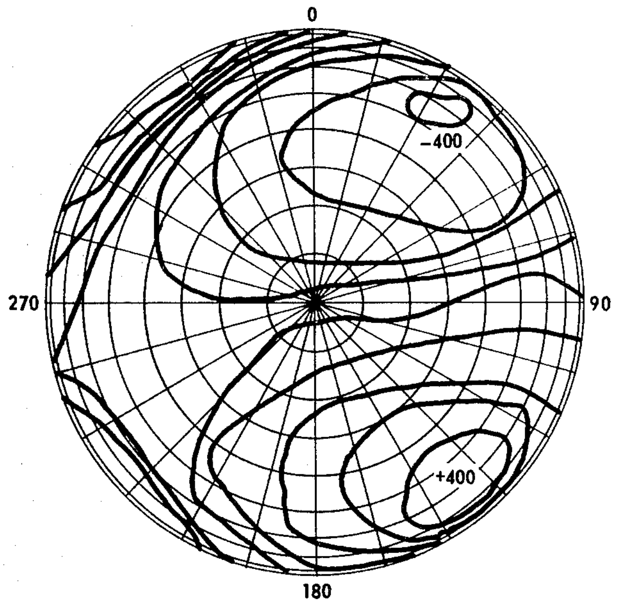

FIG. 2*a* is a representation of the blanking signal configuration compared to the scanning signal cycles in FIG. 2;

FIG. 3 is a block diagram of the circuitry used to obtain a base voltage from which the probe voltages may be measured and a neutral voltage from which the sign of the probe voltages may be determined and for interpolating the probe voltages to obtain apparent probe voltages;

FIG. 3*a* is a block diagram of each of the amplitude and sign correcting circuits $AS_1$–$AS_{35}$ in FIG. 3;

FIG. 4 is a block diagram for receiving the analog signals from the circuitry of FIG. 3, converting them to digital signals, and storing them;

FIG. 5 is a block diagram for receiving the signals from the circuitry of FIGS. 2 and 4 and performing multiplication and addition functions and processing the signals in a function generator to obtain a computed signal of electrical activity on an internal body organ for each probe and apparent probe voltage;

FIG. 5*a* is a breakdown of one of the boxes in FIG. 5 and shows the kind of circuitry that is in all of the boxes of FIG. 5;

FIG. 5*b* is a typical curve which the function generator of FIG. 5*a* uses to modify the input signal to the function generator;

FIG. 5*c* is a curve of a typical heart cycle showing the intervals at which computations may be made to get analysis of heart activity;

FIG. 6 is a block diagram for receiving the signals from FIGS. 2 and 5 to present visually the computed electrical activity of an internal body organ;

FIG. 7 is a block diagram of circuitry for receiving signals from FIGS. 2 and 6 for adding the signals from each of the six intervals in a heart cycle to obtain a sum of the heart electrical activity; and FIGS. 8 and 9 are, respectively, typical electrical activity lines that appear on cathode ray tubes 100, 102 of FIG. 6.

The preferred embodiment of this invention approximates the thoracic surface by a sphere and the heart a smaller, concentric sphere with the material therebetween homogeneous. These approximations lead only to a slight distortion without serious loss of information.

The following formula are used to obtain the electrical characteristics of the inner sphere or heart. The potential function $\phi$ is completely defined between the spheres by use of the following relationships:

(1) $\frac{\delta\phi}{\delta r}=0$ on the surface of the outer sphere (2) $\Delta^2\phi=0$ between the spheres (Laplace's equation)

(3)

$$\phi=\sum_{n=1}^{\infty}\sum_{m=0}^{n}\left(\frac{A_{nm}}{r^{n+1}}+(B_{nm})(r^n)\right)P_n^m(\cos\theta)\cos(m\Psi+\delta_m)$$

which is a solution of Equation 1 and 2) using Legendre polynomials. $\theta$, $\Psi$, $r$ are polar coordinates of a point on or between the spheres. $n$, $m$ are indices of summation. $P_n^m$ is the associated Legendre polynomial of the first kind.

In these formula, the surface distribution of $\phi$ on the outer sphere is measured at a plurality of positions. A, B are the unknown coefficients which are determined by putting in the measured values of $\phi$ along with known values of $\theta$, $\Psi$, and $r$ for points on the outer sphere or body. Once A and B are known, values of $\phi$ on the inner sphere or heart can be calculated by putting in a value of $r$ corresponding to the heart radius.

The term $r^{n+1}$ makes the equation useful for determining multipolar activity of the heart as well as dipolar activity.

Electrical potential activity on the outer sphere is determined by the above relationships from a number of probes, fifteen in the preferred embodiment, which are placed around the chest and back area of the patient. In addition, twenty additional probe signals are obtained by interpolation. Every heat-beat cycle is divided into six intervals so that each probe signal from the body surface is divided into six separate points and each point is processed to obtain the computed information of the inner sphere activity or heart activity. Additional points may be utilized for checking or other purposes.

Figure 1:
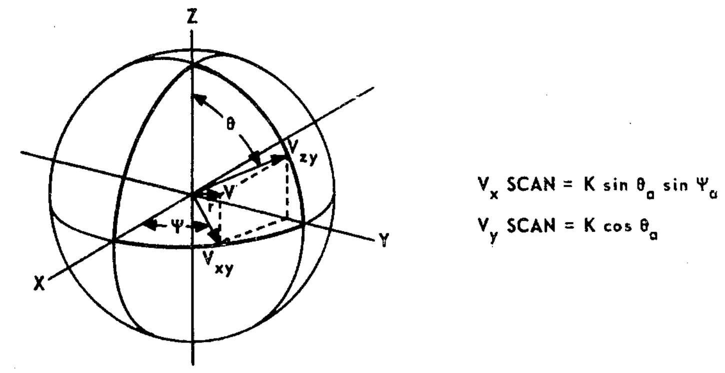
FIG. 1 shows a representation of the polar coordinates and corresponding planar coordinates.

In FIG. 1 is shown a quadrant of a sphere with a point $v$ on the sphere being projected on the Z, Y plane at $v_{zy}$ and on the X, Y plane at $v_{xy}$. The polar coordinates of the point $v$ are $\theta$, $\Psi$ and $r$. This relationship will be used in defining the operation of the following preferred embodiment. The point $v$ may be caused to scan the surface of the sphere with the radius $r$ by constantly increasing the angles $\theta$ and $\Psi$. In this embodiment, the surface of the inner sphere, or heart, is constantly scanned and the angle $\Psi$ is increased approximately one hundred times faster than the angle $\theta$ so that the point $v$ will be caused to travel one hundred more revolutions horizontally than vertically. The scanning polar coordinates are projected on two planar surfaces, one surface to represent the front inner hemisphere and one surface to represent the rear inner hemisphere.

FIG. 2 shows the block diagram for obtaining such a scanning motion of the approximated heart surface. A sixty cycle per second line voltage is fed to a phase detector 22 which in turn sends a signal to filter network 24. Network 24 drives master oscillator 26 which is a standard voltage controlled oscillator having an output of 41.16 kc. This output is divided by three seven divider circuits 28 and then a two divider circuit 30 to obtain sixty cycle per second square wave output which is sent to phase detector 22 where the phase is compared with the sixty cycle per second line voltage; if there is a phase difference, an error signal will be developed which is passed to filter network 24 and from there is sent to oscillator 46 to change the output frequency of oscillator 26.

The output from oscillator 26 is also divided by a three divider circuit 32 and a two divider circuit 34 to obtain 6860 cycles per second square wave. The output from divider 34 is connected to a cosine wave filter 36 which obtains at one output cos $\Psi_a$ and the other output is sent to an integrator 38 which obtains sin $\Psi_a$ as is well understood in the art.

The output of divider circuit 30 is sent to a cosine wave filter 40 which has an output of cos $\theta_a$ and a second output which is integrated by integrator 42 to obtain sin $\theta_a$ which in turn is sent to analog-to-digital converter 44 to obtain a digital output of sin $\theta_a$.

The outputs of dividers 30 and 34 are also sent to a front and rear blanking signal generator 46 which has conventional switch logic to obtain at its output blanking signals $G_1$ and $G_2$. The shape and frequency of the blanking signals are shown in FIG. 2*a* where it is seen that at all times the front blanking signal $G_1$ is out of phase with the back blanking signal $G_2$. The phase of front blanking signal $G_1$ agrees with that of $\Psi_a$ for one half of the $\theta_a$ cycle and is out of phase with $\Psi_a$ for the next half of $\theta_a$ cycle. It is to be noted that there are one hundred cycles of $\Psi_a$ for each cycle of $\theta_a$ but fewer are shown in FIG. 2*a* for convenience.

The blanking signals $G_1$, $G_2$ so formed will provide a constant signal projection of the front heart hemisphere on one cathode ray tube and a constant projection of the rear heart hemisphere on a second cathode ray tube which are later described. Blanking signals are provided for every half cycle of $\Psi_a$ and the phase of the blanking signals are changed every half cycle of $\theta_a$. This phase change is necessary in order to keep the representation of the same hemisphere on the same cathode ray tube.

FIG. 3 is a block diagram showing a circuit for processing the probe signals so that they have an amplitude and sign that are consistent with one another and with previous signals. There are fifteen circuits $AS_1$ to $AS_{15}$, each of which receives a probe signal $P_1$–$P_{15}$ from a corresponding probe output so that each of the fifteen probes is connected to an AS current. Also, each circuit $AS_1$ to $AS_{15}$ receives a timing signal T from circuit 58 in FIG. 4. A partially processed signal from each of circuits $AS_1$ to $AS_{15}$ is sent to a sum and average and sign inverter circuit 60 which further processes the signals as described below and sends its output back to circuits $AS_1$ to $AS_{15}$. The outputs of each of circuits $AS_1$–$AS_{15}$ are sent to each of resistance networks $R_1$–$R_{20}$ which are weighted to provide twenty interpolated probe outputs, one from each circuit $R_1$–$R_{20}$. The operation of the above circuits will become more apparent when one of the circuits $AS_1$–$AS_{15}$ is explained in detail with reference to FIG. 3*a*. All of the circuits $AS_1$–$AS_{15}$ have similar circuitry.

In FIG. 3*a*, a probe signal is amplified by amplifier 50 and then sent to a differential amplifier 52 and a delay line 54. The first portion B of the heart wave shown in FIG. 5*c*, which is just prior to the P portion of the wave, is delayed in line 54 until gate 56 sends it to storage circuit 58. This portion B of the heart wave signal is used as a reference and the remainder of the heart wave signal is compared with this reference in differential amplifier 52. Gate 56 is operated once every heart cycle by an impulse which is obtained from timing gate 58, FIG. 4, so that for every heart cycle, a new reference signal is utilized for each of fifteen probes. The storage circuit 58 continues to send the reference signal to amplifier 52 for the instant heart cycle and then a new reference is entered into storage 58 for the next heart cycle.

The output of amplifier 52 is sent to the sum and average circuit 60 where all fifteen probe signals are sent and averaged so that an average amplitude is obtained. This average amplitude is then made negative by a sign inverter in circuit 60 and sent to summing circuit 64 in each of the circuits $AS_1$–$AS_{15}$ where the negative signal is added to the output of differential amplifier 52 so that each probe will have an amplitude and sign which has relative correspondence to each of the other probes so that the signals may be computed meaningfully.

The circuit in FIG. 3 also shows means for obtaining additional probe outputs so that the fifteen probe outputs may be increased to a higher number, for example thirty five. This is accomplished by adding all the probe outputs to resistance network circuits $R_1$ to $R_{20}$ which are designed to weight the various probe outputs to obtain additional interpolated outputs. There is a resistance network for each interpolated output desired and since there are twenty outputs desired, there are twenty resistance networks.

In order to compute the currents on the inner sphere by the means of Equations 1, 2 and 3 above, it is desirable to change the thirty five probe signals from analog-to-digital form. A circuit for so doing is shown in FIG. 4 in which only one analog-to-digital converter 70 is necessary. Since there is only one converter 70, it must be time shared and therefore each of the thirty five signals, from circuits $AS_1$–$AS_{15}$ and $R_1$–$R_{20}$ in FIG. 3, are delayed a corresponding amount by delay circuits $D_1$–$D_{35}$, with a delay circuit for each of the thirty five signals, and with the outputs of the delay circuits $D_1$–$D_{35}$ being connected to commutator 76, which will connect in succession the delay circuits $D_1$–$D_{35}$ to converter 70, the output of which is connected to a second commutator 78 which communicates successively with digital storage circuits $S_1$–$S_{35}$, with a storage circuit being available for each of the thirty five probe voltages.

A special probe which is placed on the body to receive a strong initial heart signal is connected to timing gate 58 which operates through line 58*a* to coordinate commutator 76, converter 70, and commutator 78. A calibrated hand dial 86 is also connected to gate 58 so that different portions of a heartbeat wave or cycle may be displayed. In this embodiment, six separate points, taken at points 1–6 in the QRS section on the heartbeat wave of FIG. 5*c*, are examined while points 7 and 8 may be examined for a check on the first six points. The different points for examination may be obtained by delaying the opening of gate 58 to line 58*a* a corresponding amount which may be done by turning dial 86 a corresponding amount. As mentioned, a timing pulse signifying the initiation of a heartbeat is connected to gate 56 through line 58*b* in the circuit of FIG. 3 and this pulse is unaffected by the turning of dial 86.

By geometry, the cosine of any angle $\theta_n$ which is the great circle angle between a probe *n*, located at the position $\theta_b$, $\Psi_b$ and R, and a scan point on the heart $\theta_a$, $\Psi_a$, *r* may be determined by the formula given in FIG. 5*a*. Since the probes on the outer sphere are fixed, their values will be constant and hence may be represented by $K_e$, $K_f$ and $K_g$. All of the probe signals, actual and interpolated, have a fixed location which are represented by $K_e^n$, $K_f^n$, $K_g^n$, with the superscript *n* signifying the probe with which the constants are associated and which are wired in the respective circuits $C_1$–$C_{35}$. In addition, the cosine of $\theta_n$ is given a value which is a function of cos $\theta_n$ and which is determined mathematically to aid in assimilating the heart electrical signals for given probe positions and given scan positions on the heart.

The circuitry for obtaining $a_n f(\cos\theta_n)$, where $a_n$ is a coefficient for a given point on the inner sphere or heart, is shown in FIG. 5*a*. The coefficient $a_n$ is determined from processed signals picked up at the probes and stored in circuits $S_1$–$S_{35}$ of FIG. 4. Cos $\Psi_a$ and sin $\Psi_a$, obtained from circuitry of FIG. 2, will be multiplied with wired in constants $K_f$ and $K_g$ respectively, and the products are added in multiplier and adder circuit 90 and the sum is multiplied with the digital signal sin $\theta_a$ from FIG. 2 in digital-to-analog multiplier 92. The product from multiplier 92 is added to the product cos $\theta_a$, also obtained from the circuitry of FIG. 2, and the wired in constant $K_e$ in multiplier and adder circuit 94 to obtain the cos $\theta_n$. Function generator 96 processes cos $\theta$ according to the wave form shown in FIG. 5*b* to obtain $f(\cos\theta_n^n)$ which is multiplied in digital-to-analog multiplier 98 with the digital coefficient $a_n$ obtained from storage circuits $S_1$–$S_{35}$ (FIG. 4). The resulting product $a_n f(\cos\theta_n)$, is used to form a video representation of the heart activity on a pair of cathode ray tubes next to be described. The curve for function generator 96 shown in FIG. 5*b* is a summation of Legendre polynomials, Equation 3 above, which are evaluated for a specific radius ratio *r*/*R* of the two spheres and is similar for the function generators for all the probes. The function generator curve of FIG. 5*b* is the solution of the following equation:

$$\alpha_n = \alpha_n P_n(\cos\theta)$$

Where $a_n$ is a point on the curve for a given cos $\theta$, $\alpha_n$ is a function of the radius ratio of the spheres and is constant; $P_n(\cos\theta)$ is a sum of Legendre polynomials which are a function of cos $\theta$.

The circuitry for obtaining the two video displays, one of the projection of the front hemisphere and one the projection of the rear hemisphere of the heart is shown in the block diagram of FIG. 6. In order to obtain the X and Y scan voltages from the polar coordinate scan voltages, the geometric relationship shown in FIG. 6 are used. The vertical scan for both cathode ray tubes 100 and 102 is obtained by amplifying in amplifier 104 cos $\theta_a$ obtained from the circuitry of FIG. 2. The horizontal scanning voltage for both tubes 100 and 102 is obtained from the product of the sine of $\Psi_a$ and the sine of $\theta_a$ which are multiplied in digital analog multiplier 106 and then amplified in amplifier 108.

The display on tubes 100 and 102 is obtained by adding in amplifier 110 the thirty five inputs obtained from the circuits $C_1$–$C_{35}$ in FIG. 5. The output from amplifier 110 is then sent to a threshold circuit 112 which emits an output every time that one of a plurality of thresholds is exceeded by the instantaneous sum from amplifier 110. Therefore, the output of threshhold circuit 112 is a series of pulses which are one of a plurality, such as six, predetermined values which are preferably evenly spaced. As will be evident to one skilled in the art, this type of signal when applied to a cathode ray tube will result in a series of lines with each line connecting points of the same magnitude. Such a display is shown in FIGS. 8 and 9 where the lines shown are iso-current lines with each line being composed of points having the same current value.

FIG. 8 is the front projection of the current pattern of the heart sphere and FIG. 9 is the projection of the rear hemisphere of the heart sphere. The front projection is displayed on cathode ray tube 100 and the rear projection is displayed on cathode ray tube 102 with the two pictures being obtained from the output of threshold circuit 112. The signal from circuit 112 is divided by the application of blanking signals $G_1$ and $G_2$ to blanking gates 114 and 116. Gates 114 and 116 send only the front hemisphere signals to tube 100 and the rear hemisphere signals to tube 102.

Examining diagrams having iso-current lines such as those in FIGS. 8 and 9 throughout the entire heart cycle can disclose areas of scar tissue since positive current lines will not cross on scar tissue areas whereas they will cross on normal tissue areas as the heart cycle is viewed.

It is also desirable to obtain a graphical sum of all of the signals from the fifteen probes and this may be done by the circuitry shown in FIG. 7. Since mechanical graphical scanning systems operate at a much lower rate than electrical scanning systems, circuitry is utilized to plot lines only when the mechanical and electrical scanning systems have corresponding coordinates. The mechanical scanning systems, which have scanning signals X and Y, are sent to differential comparators 120, 122 respectively, and there compared with the sin $\theta_a$ sin $\Psi_a$ and cos $\theta_a$ respectively. When the positions on the slow scanning system X, Y correspond with the positions of the fast scanning system sin $\theta_a$ sin $\Psi_a$, cos $\theta_a$, then signals are sent to gates 124, 126, which pass the then current signal from sum circuit 110 in FIG. 6.

The X and Y signals are obtained from digital-to-analog converter 148, later described, and have a time duration which corresponds to approximately 20–30 heartbeat cycles so that approximately 20–30 signals for a given interval are passed to a storage and average circuit 132 where the average of the 20–30 signals is taken. If desired, additional resolution is possible by mutator 140, is then passed to an analog-to-digital converter 142 where the analog signal is digitized and sent taking two X locations with the same Y coordinate during the same period of time. This may be accomplished by adding an additional gate 134, an additional differential comparator 136, an additional storage circuit 138 and a commutator 140. The input to differential comparator 136 will be $X+K$ and sin $\theta_{a+k}$ sin $\Psi_{a+k}$, which are obtained by adding a constant K to the plane and polar coordinate, and when these two agree, the differential comparator will send a signal to gate 134 which will allow a flow of approximately 20–30 signals from the sum circuit 110 of FIG. 6 to be stored in storage and average circuit 138. The commutator 140 then operates to receive the average from average circuit 138 at the proper time and combine it with the average from circuit 132 when the coordinates $X+K$, $Y$ are being obtained from average circuit 132.

The average from circuit 132, when selected by com- to binary adder 144. A two channel tape recorder 146 has on one channel 146*a* a digital address for each X, Y coordinate on a grid on which is plotted the sum. The number of coordinates on a sample grid may be 64 x 64. The address channel 146*a* is connected to a digital-to-analog converter 148 where the X and Y coordinates for differential comparators 120 and 122 are determined. Thus, the X and Y coordinates which are operating gates 124 and 126 are obtained from the coordinated with tape recorder 146.

The second channel 146*b* of recorder 146 has a digital representation of the sum of the signals for the X, Y coordinate which is printed on the corresponding channel 146*a*. The channel 146*b* is blank at the start of a heart cycle and the amplitude sum for the first of six points in curve of FIG. 5*c* is printed thereon according to information obtained from adder 144. The calibrated dial 86 of FIG. 4 is set at the first point during this operation. After each X, Y coordinate has the first point information recorded on channel 146*b* below the address of the X, Y coordinate on channel 146*a*, the dial 86 is set to the second point and the tape is replayed with the recorded first point amplitude being sent to binary adder 144 where the second point amplitude information for each X, Y coordinate is added to the first point amplitude to obtain a sum of the first and second amplitudes, which sum is then recorded on channel 146*b* below the corresponding X, Y coordinate in channel 146*a* in place of the previous first point information which is erased.

After each X, Y coordinate has had the sum of the first and second point recorded beneath it on the tape of channel 146*b* of recorder 146, the dial 86 is set to the third point and the third point amplitude is added to this sum and recorded in place of the previous sum, which is erased. This procedure is repeated until the sum of all six points are recorded below the appropirate X, Y coordinates in binary form.

After the sum of all six intervals is recorded on the tape, the tape is replayed and fed to digital-to-analog converter 150. Plotting signals are obtained from converter 148 and cause a paper having the 64 x 64 grids to move an X, Y scan direction in plotter 154. The channel 146*b* of recorder 146 containing the amplitude information of the six intervals is sent to thershold circuit 156 which causes an output pulse to be delivered to pen drop circuit 158 every time one of a given number of thresholds is exceeded by the amplitude circuit. When a pulse is received by pen drop circuit 158, a pen is dropped on the grid paper in plotter 154 to record a given threshold level and this will result in a number of lines of the grid paper in plotter 154 which are of equal electrical sginal therefore providing "current contour" lines of the sum of all six points in the heart cycle.

Although this invention has been disclosed and illustrated with reference to particular applications, the principles involved are susceptible of numerous other applications which will be apparent to persons skilled in the art. For example, the internal body member may be the brain and brain analysis may be obtained by using the teaching of this invention. The invention is, therefore, to be limited only as indicated by the scope of the appended claims.

Having thus described our invention, we claim:

1. A method for determining the value of electric signals within a body comprising the steps of:

placing a number of probes at selected positions on the surface of a body, said positions having known coordinate values;

simultaneously measuring the value of electric signals at said probe positions on the surface of said body;

using said coordinate values and said signal values measured at each of said probe positions to obtain the value of coefficients in an equation that expresses the electric distribution for the case of a geometric form similar to said body as a function of position coordinates and said coefficients, said equation satisfying the relationship $\Delta^2\phi=0$, known as Laplace's equation; and using said first named equation to calculate the value of an electric signal at a desired point within said body using said obtained coefficients and the value of the position coordinates of said desired point within said body.

2. The method of claim 1 in which said first named equation also satisfies the relationship that the rate of change of said electric signal is the same over the entire surface of said body at any one instant.

3. The method of claim 1 further including the step of obtaining the value of electric signals at a number of points selected to define an area within said body by repeatedly solving said first named equation for the value of said electric signals using said coefficients and the values of the position coordinates of said number of points on said area.

4. The method of claim 3 further including the steps of simultaneously measuring the value of electric signals at said probes at a number of different times during a time interval; solving said equation for the value of said coefficients each time said value measurements are made; and using said resulting set of said solved coefficients to determine the value of electric signals at said number of points within said body for each of the different times at which said sets of measurements were made.

5. The method of claim 1 further including the steps of interpolating said measured electric signals to determine the value of electric signals at positions on the surface of said body other than at said probe positions, and solving said first named equation using said measured and interpolated signal values and the values of the position coordinates of said probes and other interpolated positions to determine the value of said coefficients to a greater degree of accuracy than that calculated using only said probe signals and positions.

6. The method of claim 1 in which said probes are placed on opposite surfaces of said body and said simultaneous measurement includes the measurement of signals received from both of said surfaces.

7. A method for determining the value of electric signals at any portion of an internal member of the human body that emits electric pulses comprising the steps of:

placing a number of probes at selected positions on the surface of a human body, said positions having known coordinate values;

simultaneously measuring the value of electric signals at said probe positions on the surface of said body;

using said coordinate values and said signal values measured at each of said probe positions to obtain a value of coefficients for an equation that expresses the electric distribution for a sphere as a function of position coordinates and said coefficients, said equation satifying the relationship $\Delta^2\phi=0$, known as Laplace's equation; and using said first named equation to obtain a value of the electric signal at a desired point on an area of an internal member using said coefficients and the value of the position coordinates of said point on said area.

8. The method of claim 7 in which said first named equation is the equation $$\phi=\sum_{n=1}^{\infty}\sum_{m=0}^{n}\left(\frac{A_{nm}}{r^{n+1}}+(B_{nm})(r^{n})\right)P_n^m(\cos\theta)\cos(m\Psi+\delta_m)$$

or the mathematical equivalent thereof.

9. The method of claim 7 further including the step of determining the value of electric signals for a number of points on said area by repeatedly solving said first named equation for values of said electric signals using said coefficients and the value of the position coordinates of said number of points.

10. The method of claim 9 further including the steps of simultaneously measuring the value of electric signals at said probe positions at a number of different times during an electric pulse; solving said first named equation for the value of said coefficients each time said value measurements are made; and using each resulting set of said solved coefficients to determine the value of electric signals at said points on said area for each of the different times at which said measurements were made.

11. The method of claim 7 further including the steps of interpolating said measured electric signals to determine the value of electric signals at positions on the surface of said body other than at said probe positions, and solving said first named equation using said measured and interpolated signal values and the values of the position coordinates of said probes and interpolated positions to determine the value of said coefficients to a greater degree of accuracy than that calculated using only said probe signals and positions.

12. The method of claim 7 in which said probes are placed on opposite surfaces of said human body and said simultaneous measurement includes the measurement of signals received from probes on each of said opposite surfaces.

13. The method of claim 7 further including the steps of simultaneously measuring the value of signals at said probe positions at corresponding times during a number of pulses and averaging said values to provide averaged signal values for use in said first named equation to obtain said coefficient values.

14. Apparatus for determining the value of electric signals at any portion of an internal member of the human body that emits electric pulses comprising:

probe means adapted to receive signals at a plurality of positions on the surface of a human body, the value of the coordinates of said positions being known;

measuring means adapted to receive electric signals simultaneously from said probes and measure the value of said electric signals;

computer calculating means adapted to use said position coordinate values and said signal values to determine the value of coefficients in an equation that expresses the electric distribution for a sphere as a function of position coordinates and said coefficients, said equation satisfying the relationship $\Delta^2\phi=0$, known as Laplace's equation; and said computer calculating means also being adapted to solve said first named equation for the value of an electric signal at a point on a portion of an internal body member using said determined coefficients and the value of position coordinates of said point on said area.

15. The combination of claim 14 in which said computer calculating means is adapted to solve for said coefficients using the equation $$\phi=\sum_{n=1}\sum_{m=0}^{n}\left(\frac{A_{nm}}{r^{n+1}}+(B_{nm})(r^{n})\right)P_{n}^{m}(\cos\theta)\cos(m\Psi+\delta_{m})$$

or the mathematical equivalent thereof.

16. The combination of claim 14 in which said measuring means includes a sign inverter and averaging circuit adapted so that each of said measured signal values will have an amplitude and sign consistent with the signals received from all other of said probes.

17. The combination of claim 14 in which said computer calculating means is adapted to calculate the value of the electric signals at a preselected plurality of points defining said portion of the internal body member using the value of said determined coefficients and the value of the position coordinates for said preselected plurality of points in said first named equation.

18. The combination of claim 14 wherein said measuring means includes timing means adapted to operate so that signals will be received simultaneously from said probes and measured a number of times during a pulse, said timing means and said computer calculating means being interrelated so that said coefficients are calculated for said received and measured signals.

19. The combination of claim 14 in which said measuring means includes receiver means adapted to denote the initiation of an electrical pulse by said emitting member.

20. The combination of claim 14 wherein said measuring means includes timing and storage means adapted to operate so that signals will be received from said probes at corresponding times in successive pulses, and further includes averaging means adapted to cooperate with said timing and storage means so that each of said measured electric signal values used by said computer means will represent the average of values measured at corresponding times during a number of pulses.

21. The combination of claim 14 further including a resistance circuit adapted to receive said probe signals representing electrical activity on the surface of said body and to provide said computer means with interpolated signal values which represent the value of electric signals at positions on the surface of said body displaced from said probe positions.

22. The combination of claim 14 further including means for converting said electric signal values to a digital form for use by said computer.

23. The combination of claim 17 further including display means for projecting an output display of the electrical activity at the presselected points defining said portion of said internal body member, said display means including scanning means controlled by the values of both the position coordiantes and the calculated signal values of said preselected plurality of points.

24. The combination of claim 23 in which said display means includes two display screens and switching means to further control said output display so that each screen displays the signal pattern for different parts of said portion of said internal body member.

25. The combination of claim 23 in which said display means includes a threshold circuit adapted to cooperate with said scanning means so that said output display pattern includes a plurality of lines, each line connecting points on said display which represent substantially equal preselected signal values.

References Cited

UNITED STATES PATENTS

| | | | |
|---|---|---|---|
| 2,214,299 | 9/1940 | Heller | 128—2.06 |
| 2,227,135 | 12/1940 | Hollmann | 128—2.06 |
| 2,229,698 | 1/1941 | Hollmann | 128—2.06 |
| 2,659,363 | 11/1953 | Brosselin | 128—2.06 |
| 2,714,380 | 8/1955 | Freshman | 128—2.06 |
| 2,932,549 | 4/1960 | Kling et al. | 128—2.06 XR |
| 3,186,403 | 6/1965 | Bassett | 128—2.06 |

FOREIGN PATENTS

| | | |
|---|---|---|
| 147,732 | 11/1962 | U.S.S.R. |
| 157,051 | 1/1963 | U.S.S.R. |

(Other references on following page)

OTHER REFERENCES

American Journal of Medical Electronics, 1964, April–June (pp. 34–40).

American Journal of Medical Electronics, 1964, April–June (pp. 41–46).

Johnston, F. D., Medical Physics, vol. III, 1960, pp. 237–243.

Martinek, J., et al., I.R.E. Transactions on Medical Electronics, vol. ME–6, September 1959, No. 3, pp. 112–116.

Nelson, C. U., et al., I.R.E. Transactions on Medical Electronics, vol. ME–6, September 1959, No. 3, pp. 107–109.

RICHARD A. GAUDET, Primary Examiner

K. L. HOWELL, Assistant Examiner

U.S. Cl. X.R.

235—151.3; 128–2.1

UNITED STATES PATENT OFFICE

CERTIFICATE OF CORRECTION

Patent No. 3,516,400 Dated June 23, 1970

Inventor(s) L. H. Krohn et al

It is certified that error appears in the above-identified patent and that said Letters Patent are hereby corrected as shown below:

Column 5, Line 46: "$\theta$" should be read --- $\theta_n$ ---

Column 5, Line 47: "f(cos $\theta_n^n$)" should be read --- f(cos $\theta_n$) ---

Column 6, Lines 58 and 59 are surplusage and should be read out of the specification. These lines should be read as if present at Column 7 after Line 1.

Column 7, Line 37: "appropriate" is misspelled.

Column 7, Line 45: "threshold" is misspelled.

Column 7, Line 53, "signal" is misspelled.

Signed and sealed this 17th day of August 1971.

(SEAL)
Attest:

EDWARD M.FLETCHER,JR.
Attesting Officer

WILLIAM E. SCHUYLER, JR.
Commissioner of Patents